United States Patent [19]

Rossberg

[11] Patent Number: 4,830,646
[45] Date of Patent: May 16, 1989

[54] METHOD AND DEVICE FOR RELEASABLY FIXING BARE GLASS FIBERS IN A SPLICING DEVICE

[75] Inventor: Rolf Rossberg, Schwieberdingen, Fed. Rep. of Germany

[73] Assignee: Alcatel N.V., Amsterdam, Netherlands

[21] Appl. No.: 120,087

[22] Filed: Nov. 12, 1987

[30] Foreign Application Priority Data

Nov. 18, 1986 [DE] Fed. Rep. of Germany ....... 3639458

[51] Int. Cl.$^4$ .................. C03B 37/16; C03B 23/213
[52] U.S. Cl. .................................. 65/3.11; 65/3.3; 65/4.21; 65/36; 65/42; 65/61
[58] Field of Search .............. 65/3.3, 4.1, 4.2, 17, 65/29, 31, 36, 42, 43, 61, 4.21, 3.11

[56] References Cited

U.S. PATENT DOCUMENTS 4,028,162  6/1977  Cherin et al. ................ 65/4.21
4,715,876 12/1987  Osaka et al. ................. 65/4.21

FOREIGN PATENT DOCUMENTS 0166621  1/1986  European Pat. Off. ............. 65/3.3
3338493 11/1986  Fed. Rep. of Germany .
57-104103  6/1982  Japan ......................... 65/3.3

*Primary Examiner*—Kenneth M. Schor
*Attorney, Agent, or Firm*—Christie, Parker & Hale

[57] ABSTRACT

A method is disclosed in which the bare glass fibers are firmly soldered into a solder bath of the splicing device and, after being scored and broken, unsoldered again. To that end, the glass fibers are placed across the solder bath, the solder is heated, and the level of the molten solder is raised above the glass fibers by pressing a slide into the solder trough. The heat supply to the solder bath is subsequently cut off. After the solder has cooled, the glass fibers are firmly fixed therein. To release the fixed glass fibers, the solder is liquefied again. The device for carrying out the method consists essentially of a slotted guide bar, which serves to hold the glass fibers apart, and the solder bath. The latter is a copper block which is thermally insulated from the splicing device and has a projection at one end for attaching a soldering iron.

3 Claims, 1 Drawing Sheet

METHOD AND DEVICE FOR RELEASABLY FIXING BARE GLASS FIBERS IN A SPLICING DEVICE

TECHNICAL FIELD

The present invention pertains to a method for releasably fixing bare glass fibers and to a device for carrying out the method.

BACKGROUND ART

DE-OS No. 33 38 493 discloses a method and a device for splicing glass fiber bundles. In that method, the glass fibers of the ends of two bundles which have previously been prepared for splicing are each placed and fixed in parallel V-shaped grooves of an axially and laterally movable supporting plate so that the fiber ends overlap, a glass fiber of one bundle and a glass fiber of the other bundle alternately lying side by side in each supporting plate. The glass fibers are releasably fixed in the splicing device by means of holding-down devices which are placed above the glass fibers and which press them into the grooves of the supporting plates. Minor manufacturing variations of the diameter of the glass fibers are compensated for by the design of the holding-down device as an elastic cushion. However, the adhesion produced between the pressed-down cushion and the grooves when the glass fibers are fixed is often not strong enough to safely protect the glass fibers in the splicing device from axial displacements. Such protection is necessary, however, because the end faces of the fibers must have exact 90° fractures before being welded. The fractures are made with a scoring tool which is moved within the splicing device across the glass fibers transverse to the axial direction. Tensile action on the glass fibers after scoring will result in such smooth 90° fractures.

DISCLOSURE OF INVENTION

It is the object of the invention to provide a method and a suitable device for releasably fixing bare glass fibers in a splicing device, so that there is practically no axial displacement of the glass fibers after they have been fixed. In accordance with the method aspects of the invention, the bare glass fibers are firmly soldered into a solder bath of the splicing device and, after being scored and broken, unsoldered again. To that end, the glass fibers are placed across the solder bath, the solder is heated, and the level of the molten solder is raised above the glass fibers, preferably by pressing a slide into the solder trough. The heat supply to the solder bath may then be cut off. After the solder has cooled, the glass fibers are firmly fixed therein. To release the fixed glass fibers, the solder is liquefied again.

A device for carrying out such a method may consist essentially of a slotted guide bar, which serves to hold the glass fibers apart, and the solder bath. The latter may preferably be a copper block which is thermally insulated from the splicing device and has a projection at one end for attaching a soldering iron.

BRIEF DESCRIPTION OF DRAWINGS

The invention will now be described with reference to the accompanying drawings, which show a preferred embodiment of the device for carrying out the method, and in which.

BEST MODE FOR CARRYING OUT THE INVENTION

Figure 1:
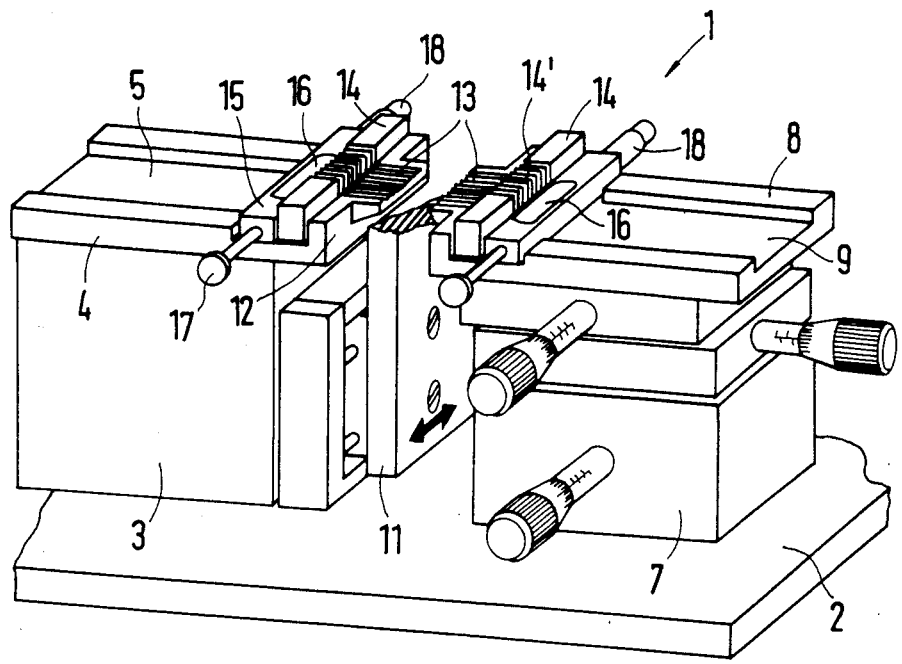
FIG. 1 is a perspective view of a splicing device with an integrated device for releasably fixing bare glass fibers.
Figure 2:
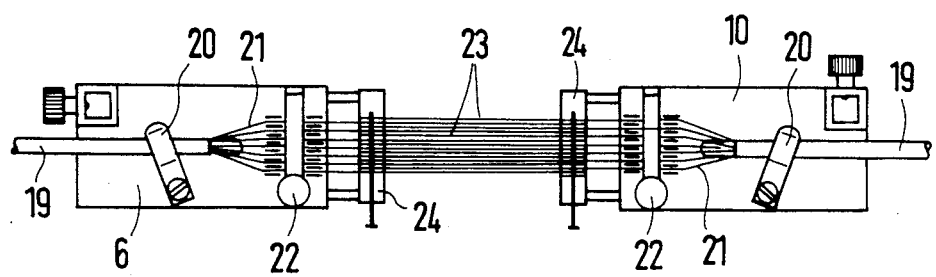
FIG. 2 is a top view of two fiber holding plates with glass fibers prepared for insertion into the splicing device.

In FIG. 1, the splicing device as a whole bears the reference numeral 1. It consists essentially of a base plate 2, a base 3 fixed thereto and a guide rail 4 which is supported by the base and which has a portion 5 for receiving a fiber holding plate 6 (FIG. 2). Furthermore, a micromanipulator 7 which is adjustable in three coordinate directions and which also supports a gguide rail 8 with a portion 9 for receiving an additional fiber holding plate 10 is located on the base plate 2 in a predetermined spatial relationship with the base 3. Finally, between the base 3 and the micromanipulator 7, a slide 11 is provided which is movable transverse to the longitudinal direction of the two receiving portions 5, 9 and on which a scoring device for producing 90° fractures of the glass fibers, and a welding device for fusing the fiber ends are located (not shown).

At the front end 12 of the guide rails 4, 8, the portions 5, 9 for receiving the fiber holding plates 6, 10 each have a stop whose top side has a groove array 13 for inserting the glass fibers. Immediately behind, in a recess of each guide rail 4, 8, a device is located for releasably fixing the glass fibers. This device consists of a slotte guide bar 14 whose slots 14' are aligned with the groove array 13, and, behind the slots 14', a solder bath 15 whose edge, at least in the area of the trough containing the solder 16, is level with the groove array 13. When the solder 16 is liquefied, a slide 17 can be inserted into the trough, thus raising the level of the solder. By withdrawing the slide 17 from the trough, the level of the solder is lowered. In the embodiment shown, the slide 17 is a simple pin with a handle portion on its outer end.

The solder bath 15 is a block-shaped body, appropriately a block of copper because of its good thermal conductivity, and has, for example, a projection 18 at one end for attaching a soldering iron which has no tip. Of course, the solder bath 15 can also be heated by means of a heating element, such as a heating wire or a heating cartridge. The heating element is then located in or below the body of the solder bath 15. Another possibility of heating the solder is to design the block-shaped body of the solder bath 15 as an insulator and to heat the solder 16 by direct passage of current. The solder bath is thermally insulated from the receiving portions 5, 9 and the guide bar 14 by small glass plates or other suitable means.

In FIG. 2, the ends of two glass fiber bundles 19 are each fixed to one fiber holding plate 6, 10 by clamping springs 20. Moreover, the spread-out bundle of individual fibers 21 from which the outer covering has been removed over part of their length are fixed to the fiber holding plate by means of a pivoted lever 22 and are again held, together with the bare glass fibers 23 stripped of their primary coating from another such bundle in a precision-guiding member 24 at the front end of the fiber holding plates 6, 10, each glass fiber 23 of one bundle lying next to the end of a glass fiber of the other bundle. The distance between the precisionguiding members 24 of both fiber holding plates is so chosen that the fiber holding plates 6, 10 which may, for example, be rigidly connected by a stirrup, can be inserted behind the solder baths 15 into the receiving portions 5, 9 of the splicing device 1.

When the fiber holding plates 6, 10 are inserted into the receiving portions 5, 9 of the splicing device 1, the glass fibers 23 projecting from the precision-guiding members 24 are simultaneously placed into the slots 14' of the guide bars 14. The glass fibers 23 lie in the individual grooves of the groove arrays 13 and also flat on the edges of the solder baths 15. In the groove arrays 13, which are preferably made of steel, the glass fibers 23 can be protected from the possibility of falling out after the fibers have been separated, by placing magnetic rubber cushions on the glass fibers 23. To fix the bare glass fibers 23, which, in the single-mode design, have a diameter of only 0.125 mm, so as to secure them against axial tensile action, the solder 16 of each solder bath 55 is heated until the solder liquefies, a narrow holding-down device is placed across the glass fibers 23 at the center of the solder bath, and the level of the solder is raised above the glass fibers by pressing the slide 17 into the trough. The holding-down device, which may be designed as a wire stirrup, ensures that the glass fibers 23 do not float on the molten solder 16 and that the solder can pass between the closely adjacent glass fibers, which have a very small clear distance of about 0.25 to 0.3 mm from each other, and surround them individually. The slots 14' of the guide bar 14 and the slots of the precision-guiding member 24 prevent the glass fibers 23 from sticking to each other in the molten solder 16. When the solder 16 is cooled until it solidifies, for example by removing the solder iron, the glass fibers 23 are firmly and tightly embedded in the solder without any requirement that they have previously been metalized, and they can no longer slide in the axial direction if they are exposed to tensile action.

After the fiber ends have been scored and broken, the solder 16 is liquefied again, the level of the solder is lowered, the holding-down device removed from the solder bath 15 or swung back, and any remaining solder is removed from the glass fibers 23. The heat supply to the solder bath is then cut off to cool it down. The fiber ends can then be welded and subsequently removed from the splicing device 1. It is of course also possible to first weld the fiber ends together after scoring and breaking them, and to remove the fixed glass fibers 23 only after heating the solder bath 15.

The present invention has been described above with regard to the structure, function and use of a presently contemplated specific embodiment of the invention. It should be appreciated by those skilled in the art that many modifications and variations are possible. Accordingly the exclusive rights afforded hereby should be broadly construed, limited only by the spirit and scope of the appended claims.

What is claimed is:

1. A method for splicing individual optical glass fibers of a first bundle of fibers to corresponding fibers of a second bundle, said fibers of each bundle having bare end portions, said method comprising the steps:

pre-fixing the bare end portions of the fibers in said first bundle to a splicing device, thereafter soldering the bare glass fibers into a solder bath integral with the splicing device, thereafter scoring and breaking the individual fibers of the first bundle by applying an axial force, thereafter moving the ends of the first bundle into proximity with corresponding ends of the second bundle, thereafter welding the broken ends of the first bundle to the corresponding ends of said second bundle aligned therewith, and thereafter unsoldering said first bundle of fibers by liquefying the solder in said solder bath and removing the solder from the fibers.

2. The method of claim 1, wherein said prefixing step further comprises the steps clamping said fibers to at least one fiber holding plate, and thereafter.

inserting said plate in a receiving portion of the splicing device.

3. A method for splicing individual optical glass fibers of a first bundle of fibers to corresponding fibers of a second bundle, said method comprising the steps:

clamping said first bundle of fibers to at least one fiber holding plate; thereafter placing the first bundle of glass fibers so that they project from the fiber holding plate into a guide bar of a splicing device; thereafter inserting the plate in a receiving portion of the splicing device so that the projecting portions of the first bundle of fibers lie flat on the edge of a solder bath integral with the splicing device; thereafter heating solder in the soldering bath until it liquefies; thereafter placing a holding-down device across the first bundle of glass fibers at the center of the solder bath; thereafter raising the level of the molten solder above the first bundle of glass fibers; thereafter cooling the solder until it solidifies; thereafter scoring and breaking said fibers in said first bundle by applying an axial force; thereafter moving the ends of the first bundle into proximity with corresponding ends of the second bundle, thereafter welding the broken ends of the first bundle of fibers still secured into said solder bath to the corresponding ends of the second bundle aligned therewith; thereafter liquefying the solder again; thereafter lowering the level of the molten solder; thereafter removing the holding-down device, and thereafter removing the first bundle of glass fibers from the solder bath.

* * * * *